United States Patent [19]
Beck et al.

[11] Patent Number: 5,295,417
[45] Date of Patent: Mar. 22, 1994

[54] MULTISTEP FINISHING PROCESS FOR SAW BLADE TEETH AND A SAW FINISHING MACHINE TO CARRY OUT THE PROCESS

[75] Inventors: Ernst Beck, Maselheim; Erich Pokorny, Schemmerhofen, both of Fed. Rep. of Germany

[73] Assignee: Vollmer Werke Maschinenfabrik GmbH, Biberach/Riss, Fed. Rep. of Germany

[21] Appl. No.: 952,520

[22] PCT Filed: May 6, 1992

[86] PCT No.: PCT/EP92/00986
§ 371 Date: Dec. 8, 1992
§ 102(e) Date: Dec. 8, 1992

[30] Foreign Application Priority Data
May 7, 1991 [DE] Fed. Rep. of Germany ....... 4114942

[51] Int. Cl.⁵ ............ B23D 63/20; B23D 65/00; C21D 9/24
[52] U.S. Cl. ............................. 76/25.1; 76/112
[58] Field of Search .............. 76/25.1, 112; 266/92, 266/125, 129

[56] References Cited

U.S. PATENT DOCUMENTS
3,502,312  3/1970  Douglass.

FOREIGN PATENT DOCUMENTS
1477122  4/1967  France.
2387095  11/1978  France.
57-60017  4/1982  Japan.
2063734  6/1981  United Kingdom.

*Primary Examiner*—Roscoe V. Parker
*Attorney, Agent, or Firm*—Woodard, Emhardt, Naughton, Moriarty & McNett

[57] ABSTRACT

A saw blade (10) is moved stepwise for complementary finishing operations through a first station (20) and a second station (40) and is stopped whenever a tooth (12) has reached a desired position at the first station (20). Finishing of a second tooth at the second station (40) simultaneously with the finishing of the tooth at the first station is prepared in that the position of the second tooth is determined, which position depends on tooth pitch errors, and a finishing device (60) is moved into a corresponding position for work.

10 Claims, 3 Drawing Sheets

MULTISTEP FINISHING PROCESS FOR SAW BLADE TEETH AND A SAW FINISHING MACHINE TO CARRY OUT THE PROCESS

The invention relates to a multistep finishing process carried out on saw blade teeth, wherein
a saw blade is moved step by step through a first station and a second station for complementary finishing operations,
the saw blade motion is stopped whenever a tooth has reached a desired position in the first station,
that tooth is finished during standstill of the saw blade at the first station, and
the same tooth later on is finished also at the second station.

The invention also relates to a saw finishing machine for carrying out such a process, comprising
fixtures for retaining a saw blade,
first and second stations for finishing a tooth each of the saw blade, and
a feeder means adapted to move the saw blade stepwise in such manner that a respective tooth will adopt a desired position in the first station.

In the case of a known saw finishing machine of this generic kind (DE 29 40 730 A1) a fixture for retaining a saw blade is disposed between a soldering tool and a pair of flank grinders. To repair a saw blade which is furnished with hard metal plates, first all the teeth having a damaged hard metal plate are placed one after the other in the working range of the soldering tool so as have the hard metal plates unsoldered. Subsequently, all the plate seats which have become free are reworked, and then fresh hard metal plates are attached by soldering with the same soldering tool and, finally, these hard metal plates are ground by the two flank grinders at the flanks and at the tooth circumference, too, where required. It is not intended to have the flank grinders operate at the same time as the soldering tool, nor is that possible with the known machine due to tooth pitch errors which are unavoidable, at least with greater saw blades. At any point in time, therefore, either the soldering tool or the pair of flank grinders is not utilized, and the complete finishing of a saw blade takes a corresponding length of time.

It is the object of the invention to shorten the time of finishing a saw blade of which individual teeth or all of the teeth require a plurality of successive operational steps to be taken.

Starting from a process of the kind specified initially, this object is met, in accordance with the invention, as far as the process is concerned, in that
to begin with, a starting point is set which will be located remote from a predetermined edge of the tooth which is stopped at the second station whenever the saw blade has come to a halt, no matter what the tooth pitch error is,
prior to each finishing operation of a tooth at the second station, a sensor is moved in longitudinal direction of the saw blade, starting from the starting point, to a reference point which depends on the position of the edge of that tooth,
a finishing device in each instance is moved from an inoperative position into an operative position by a distance which depends on the path of the sensor from the starting point to the reference point to finish the tooth which is located at the second station, and following each finishing operation, the sensor is returned to the starting point and the finishing device to the inoperative position.

In this manner two or more operations can take place at the same time at a saw blade which is characterized by more or less great and irregular tooth pitch errors, without impairing the accuracy of the finishing due to the pitch errors. The type of work to be done is of secondary importance. Applying tooth tips of hard material and subsequent heat treatment may be mentioned as an example, or the soldering and subsequent grinding of small hard metal plates, or the grinding of tooth faces and tooth backs. In any case, the simultaneous accomplishment of two or more operating steps to which a saw blade is subjected means saving time and that, in turn, contributes to lowering the cost of making or repairing the saw blade.

To the extent that the object in question relates to a machine, it is met, in accordance with the invention, starting from a saw finishing machine of the kind mentioned initially, in that a sensor for scanning a predetermined edge of a tooth and a finishing device for finishing that tooth are reciprocable in common at the second station in and against the direction of movement of the saw blade.

An embodiment of the invention will be described in greater detail below with reference to diagrammatic drawings, in which.

Figure 1:
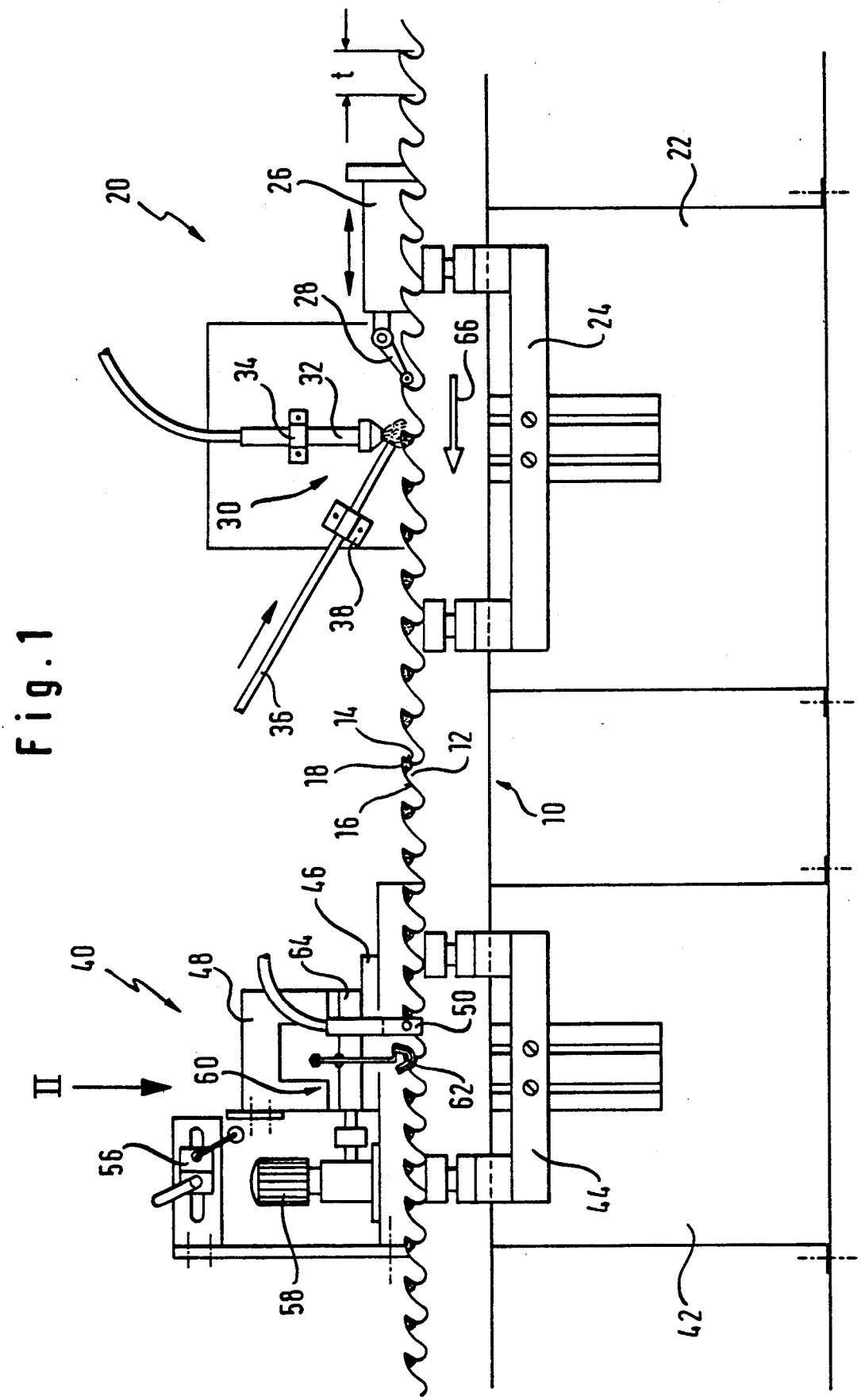
FIG. 1 is a side elevational view of a saw finishing machine according to the invention.
Figure 2:
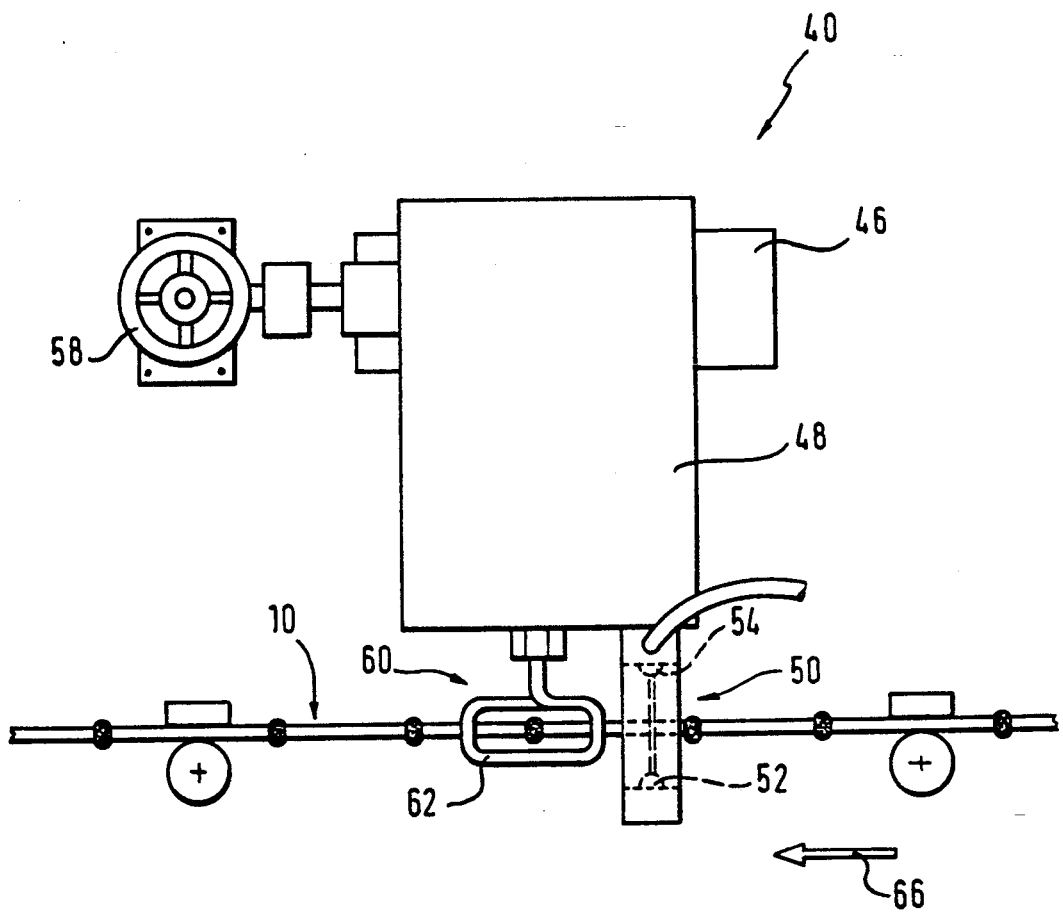
FIG. 2 is the partial top plan view in the direction of arrow II in FIG. 1.
Figure 3:
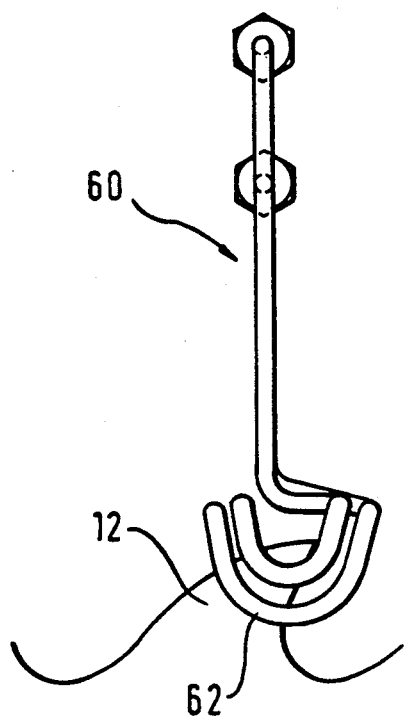
FIG. 3 is an enlarged cut-out of FIG. 1.
Figure 4:
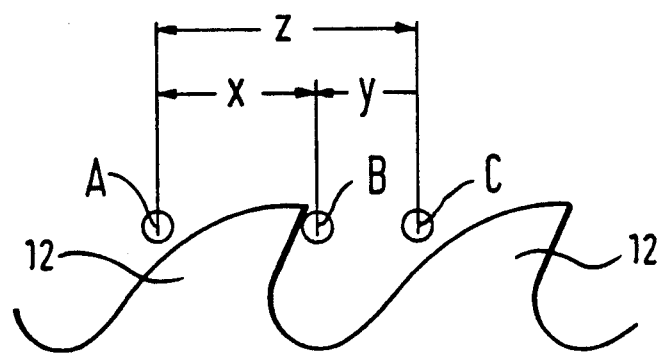
FIG. 4 is a motion diagram relating to FIG. 3.

The machine illustrated here is destined for use in finishing a saw blade 10 of a band saw whose teeth 12 are punched out either individually or in groups and have a tooth pitch t which shows certain errors that may sum up to remarkable total pitch errors over a plurality of teeth. Each tooth 12 has a steep edge 14 which presents a forwardly directed tooth face during sawing and a tooth back 16. A tooth tip 18 of molten material which becomes hard as it cools down is to be applied at the point of intersection between the face and the back of each tooth 12, and subsequently a transitional area between the tip of the tooth and the remainder of the tooth is to be annealed, i.e. freed of embrittlement by being heated to a temperature below the melting point of the tooth tip.

For attachment of the tooth tips, the saw blade 10 passes through first station 20 provided with a rack 22 which comprises a fixture 24 adjustable in height to guide the saw blade, a feeder means 26 including a pawl 28 to push forward the saw blade, and a first finishing device 30 which includes a burner 32, a burner guide member 34, a rod of material 36, and a rod guide member 38. The pawl 28 of the feeder means 26 is reciprocable in stepwise fashion, engaging the steep edge 14 of a tooth 12 at the onset of each forward stroke and then pushing the saw blade 10 forward by one tooth pitch. In the present context forward means longitudinal movement of the saw blade 10 contrary to its cutting direction in which it is moved during sawing. The rod of material 36, for example, consists of Stellite and is adapted to be advanced in stepwise or continuous fashion along its rod guide member 38 in correspondence with the melting of material under the action of the burner 32. The burner 32 is adjustable along the burner guide member 34 and is movable up and down, if required, in synchronization with advancing movements of the saw blade.

The first station 20 is followed, at a distance which equals a multiple of the tooth pitch t, by a second station 40 likewise comprising a rack 42 with a fixture 44 which is adjustable in height to retain the saw blade 10. The second station 40 further comprises a bed 46 which extends parallel to the feeding direction of the saw blade 10 and supports a carriage 48 which is movable back and forth in this direction. A sensor 50 in the form of a fork-like yoke open at the bottom is secured to the carriage so as to extend over the saw blade 10 from above. At one side of the saw blade the sensor comprises a transmitter 52 and at the other side a receiver 54 to receive radiation, such as visible light.

A terminal switch 56 which is adjustable manually in parallel with the longitudinal direction of the bed 46 is disposed at the rack 42 of the second station 40. It defines an inoperative position from which the carriage 48 can be moved by a motor 58 against the direction of advance of the saw blade 10.

A second finishing device 60 comprising a multihelical induction loop 62 is secured to the carriage 48 further remote from the first station 20 than the sensor 50. In a manner similar to the sensor 50, the second finishing device has a bifurcated outline which is open at the bottom so that the teeth 12 can be moved through the induction loop 62 when the saw blade 10 is moved forward. The sensor 50 and/or the second finishing device 60 including the induction loop 62 are adjustably secured in a longitudinal guide means on the carriage 48 so that their mutual spacing is variable.

During the stepwise advancing motion, the saw blade 10 is fed in the direction of arrow 66 by one tooth pitch t each so that the tooth face 14 of the tooth 12 will adopt a precisely defined position in the first station 20. Another tooth 12 which has passed the first station 20 earlier on and has overcome the distance between this station and the second one 40 in steps now assumes a position in the second station 40 which is not determined from the very beginning because this position depends on the sum of all pitch errors of the saw blade 10 between the first station 20 and the second station 40. For this reason it is not possible to arrange the second finishing device 60, from the start, at the optimum location for working on the respective tooth 12 which is stopped at the second station 40. Yet the second finishing device 60 must be positioned accurately with respect to each individual tooth 12 in order for the induction loop 62 to be able to heat all the teeth 12 uniformly which pass the loop one after the other. That is achieved in the following manner:

The inoperative position of the carriage 48 including the second finishing device 60 as well as the arrangement of the sensor 50 on the carriage 48 are selected such that the sensor 50 will be placed at a starting point A whenever the saw blade 10 is stopped. This starting point, under any circumstances, will be remote from the steep edge 14 of the tooth 12 to be finished at the second station 40 and thus will not coincide with this edge at any total pitch error to be expected between this tooth and the tooth which is located in the first station 20 at the same time.

Each time the saw blade 10 has been stopped, the carriage 48 is moved by the motor 58 in opposite sense to the arrow 66 until the sensor 50 reaches a reference point B whose location is determined, from case to case, by the steep edge 14 of the tooth 12 to be finished at the second station 40. This means that the sensor 50, and the second finishing device 60 together with it, travel through a path x which is smaller than the pitch t. In the embodiment shown, this path x is not sufficient to position the second finishing device 60 because the induction loop 62 is located at a spacing y from the sensor 50 since it has a certain space requirement and also to avoid any heating of the sensor. Therefore, the motor 58 is adjusted or controlled in such a way as to move the carriage 48, including the sensor 50 and the second finishing device 60, by the spacing y after having covered the path x. The total distance travelled thus is $z = x + y$.

Now then is the second finishing device 60 positioned such that the induction loop 62 encloses the tooth 12 to be heated in the intended manner which is precisely reproducible regardless of tooth pitch errors. The sensor 50 now assumes a terminal point C which is located at spacing y from reference point B.

It may prove necessary to devise the sensor 50 and/or the second finishing device 60 so as to be adjustable in height cyclically under certain conditions, for example when it is desirable to reduce the spacing y to a very small value or even down to zero. As a rule, however, the spacing y has a finite value which is firmly set before the finishing work on a saw blade 10. As a rule, therefore, the finishing device 60 and the sensor 50 will be moved on by a firmly set distance of value y after each individual tooth 12 to be finished at the second station 40 has been scanned, the finishing device 60 together with the sensor 50 having travelled through path x which is not fixed from the beginning.

This onward movement may be assured, for instance, by providing, as the motor 58, a DC motor which has a slow-down path, defined by an adjustable timing circuit, once the sensor 50 has reached the reference point B. As an alternative, the motor 58 may be a stepping motor which continues to receive an adjustable number of pulses after the sensor 50 has reached the reference point B.

What is claimed is:

1. A multistep finishing process carried out on saw blade teeth, wherein saw blade (10) is moved step by step through a first station (20) and a second station (40) for complementary finishing operations, the saw blade (10) motion is stopped whenever a tooth (12) has reached a desired position in the first station (20), that tooth (12) is finished during standstill of the saw blade (10) at the first station (20), and the same tooth (12) later on is finished also at the second station (40), characterized in that to begin with, a starting point (A) is set which will be located remote from a predetermined edge (14) of the tooth (12) which is stopped at the second station (40) whenever the saw blade (10) has come to a halt, no matter what the tooth pitch error is, prior to each finishing operation of a tooth (12) at the second station (40), a sensor (50) is moved in longitudinal direction of the saw blade (10), starting from the starting point (A), to a reference point (B) which depends on the position of the edge (14) of that tooth (12), a finishing device (60), in each instance, is moved from an inoperative position into an operative position by a distance (z) which depends on the path (x) of the sensor (50) from the starting point (A) to the reference point (B) to finish the tooth (12) which is located at the second station (40), and following each finishing operation, the sensor (50) is returned to the starting point (A) and the finishing device (60) to the inoperative position.

2. The process as claimed in claim 1, characterized in that the inoperative position of the finishing device (60) is disposed at a predetermined spacing (y) from the starting point (A) of the sensor (50) and the distance (z) by which the finishing device (60) is moved is greater by this spacing (y) than the path (x) of the sensor (50) from the starting point (A) to the reference point (B).

3. The process as claimed in claim 2, characterized in that, whenever the saw blade (10) has come to a stop, the finishing device (60) is moved from its inoperative position to meet the tooth (50) which is stopped at the second station (40).

4. The process as claimed in claim 1, characterized in that the starting point (A) is set such that the path (x) of the sensor (50) towards the reference point (B) always will be smaller than the tooth pitch (t).

5. The process as claimed in claim 1, characterized in that a material which hardens as it cools down is molten onto the tooth (12) which is stopped at the first station (20), and the tooth (12) which is stopped at the second station (40) is annealed.

6. A saw finishing machine for carrying out the process as claimed in claim 1, comprising fixtures (24, 44) for retaining a saw blade (10), first and second stations (20, 40) for finishing a tooth (12) each of the saw blade (10), and a feeder means (26) adapted to move the saw blade (10) stepwise in such manner that a respective tooth (12) will adopt a desired position in the first station (20), characterized in that a sensor (50) for scanning a predetermined edge (14) of a tooth (12) and a finishing device (60) for finishing that tooth (12) are reciprocable in common at the second station (40) in and against the direction of movement (66) of the saw blade (10).

7. The saw finishing machine as claimed in claim 6, characterized in that the sensor (50) and the finishing device (60) are arranged on a common carriage (48) at an adjustable spacing (y) from each other.

8. The saw finishing machine as claimed in claim 6, characterized in that the sensor (50) comprises a transmitter (52) and a receiver (54) disposed at one or the other side of the saw blade (10), respectively, and mounted on a yoke which spans the teeth (12).

9. The saw finishing machine as claimed in claim 8, characterized in that the sensor (50) is adjustable in the plane of the saw blade (10) transversely of the direction of movement (66) thereof.

10. The saw finishing machine as claimed in claim 6, characterized in that the finishing device (30) at the first station (20) is a device for melt-applying a material which hardens as it cools down, and the finishing device (60) at the second station (40) comprises an induction loop (62).

* * * * *

UNITED STATES PATENT AND TRADEMARK OFFICE
CERTIFICATE OF CORRECTION

PATENT NO. : 5,295,417

DATED : March 22, 1994

INVENTOR(S) : Ernst Beck et al.

It is certified that error appears in the above-identified patent and that said Letters Patent is hereby corrected as shown below:

In column 4, line 45, before the word "saw" insert the word -- a --.

In column 4, line 50, after "(20)," insert a paragraph.

Signed and Sealed this

Fifth Day of July, 1994

Attest:

BRUCE LEHMAN

Attesting Officer

Commissioner of Patents and Trademarks